United States Patent
Zhang et al.

(10) Patent No.: US 6,296,689 B1
(45) Date of Patent: Oct. 2, 2001

(54) FILTER FOR CHEMICAL OXYGEN GENERATORS

(75) Inventors: Yunchang Zhang, Overland Park; Michael J. Brumely, Shawnee; James C. Cannon, Overland Park; John E. Ellison, Shawnee; Girish S. Kshirsagar, Lenexa, all of KS (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 09/526,616

(22) Filed: Mar. 16, 2000

Related U.S. Application Data

(63) Continuation of application No. 09/016,111, filed on Jan. 30, 1998, now Pat. No. 6,071,329.

(51) Int. Cl.[7] .................... A61L 9/00; B01J 37/34
(52) U.S. Cl. .................... 95/131; 95/132; 95/137; 96/154; 422/122; 428/408
(58) Field of Search .................... 95/131, 132, 137; 96/154; 427/215, 226, 380; 422/122; 428/408; 55/522, DIG. 30, DIG. 35; 502/56, 183, 184, 417; 131/334, 342

(56) References Cited

U.S. PATENT DOCUMENTS

| | | |
|---|---|---|
| 2,920,050 * | 1/1960 | Plazet et al. .................... 55/522 |
| 2,920,051 * | 1/1960 | Wiig et al. .................... 422/122 |
| 3,276,846 | 10/1966 | Moni et al. . |
| 3,355,317 * | 11/1967 | Keith, II et al. .................... 427/215 |
| 3,739,550 * | 6/1973 | Martin et al. .................... 95/137 |
| 4,315,837 | 2/1982 | Rourke et al. . |
| 4,457,898 | 7/1984 | Hill et al. . |
| 4,537,748 | 8/1985 | Billiet . |
| 4,594,231 * | 6/1986 | Nishino et al. .................... 95/131 |
| 4,623,520 | 11/1986 | Robinet . |
| 4,687,640 | 8/1987 | Schillaci . |
| 4,802,898 | 2/1989 | Tolles . |
| 4,832,926 | 5/1989 | Schillaci . |
| 4,925,631 | 5/1990 | Harwood, Jr. et al. . |
| 4,963,327 | 10/1990 | Russell . |
| 5,029,578 * | 7/1991 | Swiatosz .................... 55/DIG. 35 |
| 5,038,768 * | 8/1991 | McGoff et al. .................... 55/DIG. 35 |
| 5,186,903 * | 2/1993 | Cornwell .................... 422/122 |
| 5,221,520 * | 6/1993 | Cornwell .................... 55/DIG. 30 |
| 5,238,897 | 8/1993 | Cornwell . |
| 5,254,323 | 10/1993 | Itoh et al. . |
| 5,262,129 | 11/1993 | Terada et al. . |
| 5,300,271 | 4/1994 | Golden et al. . |
| 5,372,788 | 12/1994 | Kinoshita et al. . |

FOREIGN PATENT DOCUMENTS

WO 93/17962    9/1993   (WO) .

OTHER PUBLICATIONS

*Chemical Dictionary*, Roger Grant & Claire Grant, Fifth Edition by McGraw–Hill Book Company, 1969.*

* cited by examiner

Primary Examiner—David A. Simmons
Assistant Examiner—Minh-Chau T. Pham
(74) Attorney, Agent, or Firm—Fulwider Patton Lee & Utecht, LLP

(57) ABSTRACT

The filer contains about 1–15% lithium hydroxide and about 85–99% hopcalite material, having a particle size approximately 20 to 100 mesh, and can be used in combination with a chemical oxygen generator for removing chlorine gas and carbon monoxide.

8 Claims, 1 Drawing Sheet

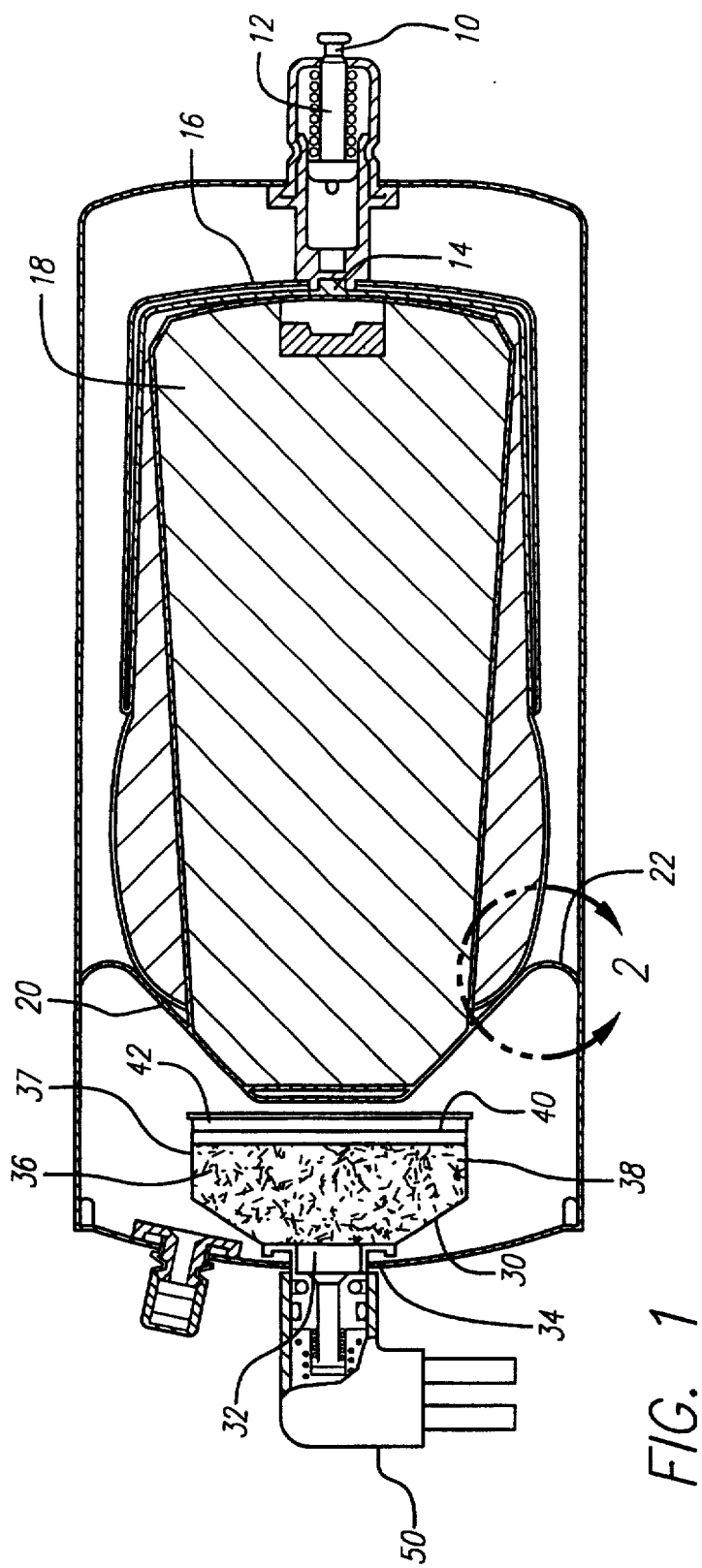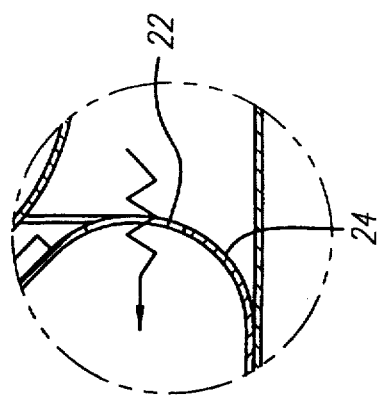

FILTER FOR CHEMICAL OXYGEN GENERATORS

RELATED APPLICATIONS

This is a continuation of Ser. No. 09/016,111 filed Jan. 30, 1998 now U.S. Pat. No. 6,071,329.

BACKGROUND OF THE INVENTION

1. Field of the Invention

This invention relates generally to chemical oxygen generators, and more particularly concerns an improved filter for removing chlorine and carbon monoxide in oxygen produced by chemical oxygen generators.

2. Description of Related Art

Chemical oxygen generators are typically used in situations requiring emergency supplemental oxygen, such as in aviation, during decompression, in mine rescue operations, in submarines, and in other similar settings. Chemical oxygen generating compositions based upon the decomposition of alkali metal chlorates or perchlorates have long been used as an emergency source of breathable oxygen, such as in passenger aircraft, for example. Oxygen for such purposes must be of suitably hih purity. For example, the requirements of SAE Aerospace Standard AS8010C are frequently applicable to oxygen used for breathing in aviation applications.

A typical chemical oxygen generating candle may have several layers with different compositions to obtain different reaction rates and flow rates which are desired at different stages during the period of operation. The candle typically has a generally cylindrical shape with a taper, with a recess at one end to hold an ignition pellet. The ignition pellet is ignited by firing a primer, and heat from the ignition pellet then ignites the reaction of the candle body, generating oxygen.

Chemical oxygen generators commonly utilize sodium chlorate, potassium perchlorate, and lithium perchlorate as sources of oxygen. Upon decomposition, the chlorate or perchlorate releases oxygen. In a typical chemical oxygen generator, a sodium chlorate candle is encased in a stainless steel canister, and oxygen is generated by decomposition of sodium chlorate in the presence of a commonly used fuel, such as iron powder, to provide extra heat to sustain the decomposition. Up to several hundred ppm chlorine gas is typically produced along with the oxygen, through side reactions and some organic contamination.

Iron powder typically contains 0.02% to 1% carbon that can also contaminate the oxygen released with up to 1,000 ppm of carbon monoxide. Above 710° C., thermodynamic constraints also favor carbon monoxide formation over formation of $CO_2$. Since iron is a very energetic fuel, and loading can be relatively high in some portions of the candle, temperatures in excess of 710° C. can easily be reached. Even after oxygen evolution has ceased in those sections of the candle, temperatures typically continue to rise due to the oxidizing environment that is produced that can increase the extent of oxidation of iron. Thus, high levels of carbon monoxide in the oxygen produced by the initial stages of a candle fueled by carbon-containing metal powders such as iron are common, so that both chlorine gas and carbon monoxide must be removed to provide a safely breathable gas. The percussion primer, commonly used as an actuating means, contains organic compounds which can be a source of carbon monoxide. Electrical squibbs can also produce carbon monoxide. Thus, some carbon monoxide can be a contaminant of the liberated oxygen, even when steps are taken to reduce or eliminate carbon content in other materials used. Currently typically no more than 0.2 ppm chlorine and 15 to 50 ppm carbon monoxide is allowed in the oxygen provided for aviation.

In order to use iron powder as a fuel in an oxygen generator, it is economically preferable to utilize a filter to convert the carbon monoxide produced to the less toxic carbon dioxide. Granular soda lime, which commonly is a mixture of calcium oxide with sodium hydroxide or potassium hydroxide, has been used for the removal of carbon dioxide, water vapor, and chlorine gas from oxygen produced by chemical oxygen generators, but soda lime does not remove carbon monoxide. In addition, upon reacting with the residual moisture in the oxygen, soda lime has a tendency to become a soft, sticky, sludge-like material that can cause the oxygen generator to fail.

Activated carbon has traditionally been used to remove chlorine gas. However, since the carbon burns at about 300° C. in oxygen, it is not appropriate to use activated carbon in a pure oxygen, high temperature environment.

A great majority of conventional chemical oxygen generators have either cast filters or granular bed filters with hopcalite, which is a mixture of manganese dioxide and copper oxide, as their active component. A cast filter is commonly made by mixing hopcalite and ceramic fiber or glass fiber in water or optionally in an alkaline solution. The slurry is then poured into a filter mold, and the excess solution is drained, optionally using suction to facilitate removal of this excess solution. The filter is then ejected from the mold and dried. Since this filter uses only hopcalite and ceramic fibers, it is effective for carbon monoxide removal, but is less effective for chlorine gas removal. Use of the optional alkaline solution may enhance chlorine removal. Cast filters are usually cast one at a time, making the process slow and expensive. Cast filters are also susceptible to mechanical damage that can result in filter failure, and can add up to 50 grams to the weight of an iron fueled oxygen generation system, which can be considerable disadvantages if the oxygen generation system is to be used on board aircraft.

Granular hopcalite bed filters are also used in some chemical oxygen generators for removing carbon monoxide, and are generally packed in a filter bed at the outlet end inside of the generators. The granules typically have a particle size between 10 and 20 mesh. However, such granular hopcalite bed filters are not very efficient, and more than 40 grams of hopcalite are needed to be used for each generator. Granular hopcalite bed filters commonly have some activity in removing chlorine gas, but the capacity of this type of filter for chlorine gas is quite low; when the level of chlorine gas produced by chemical oxygen generators is approximately 100 ppm, the chlorine gas will typically break through the filter in less than five minutes. This is not acceptable for aviation applications, for which chemical oxygen generators are required to supply oxygen for at least ten minutes. Granular hopcalite bed filters are also susceptible to damage from vibration, which can be a problem, since chemical oxygen generators in aircraft are frequently subjected to vibration. During vibration, the granules abrade against one another, so that the particle sizes of the granules are gradually reduced, and the filter bed becomes more tightly packed, settling to the bottom of the filter bed and creating channels that can lead to failure of the filter. In order to avoid the effects of abrasion, settling and channeling, the filter bed is usually loaded as several layers of hopcalite granules with ceramic fiber or glass fiber pads in between the hopcalite layers. However, it is difficult to pack the layers of hopcalite evenly inside the filter compartments, and the assembly process is typically slow and tedious. The filter pads in between the hopcalite layers further increase the overall weight of the filter.

Granular hopcalite coated with sodium hydroxide, and particularly the fraction of the granular material having particle sizes between 10 and 20 mesh, has been used to make filters for chlorine removal. However, such filters are heavy and difficult to assemble, with three layers of hopcalite being used with fiber pads in between the layers, and the hopcalite alone weighing more than 40 grams. Furthermore, sodium hydroxide is deliquescent, absorbing moisture rapidly, so that the filter material needs to be isolated from the ambient air during manufacture of the filter, increasing manufacturing difficulty and costs. In addition, sodium hydroxide can form a sort of glaze or coating which can reduce surface area and greatly interfere with the ability of the filter to remove carbon monoxide and chlorine gas.

It is therefore desirable to provide a filter material that is more effective in removing chlorine and carbon monoxide, permitting less of the material to be used in making the filters so that the filters can be made lighter and easier to manufacture than conventional filters. The present invention meets these needs.

SUMMARY OF THE INVENTION

Briefly, and in general terms, the present invention provides for an improved filter material that is more effective in removing chlorine and carbon monoxide, thus allowing for the manufacture of much lighter filters that also are easier to manufacture.

In one aspect, the invention accordingly provides for a filter material comprising a mixture of hopcalite and lithium hydroxide, having a particle size of approximately 20 to 100 mesh. In one presently preferred embodiment, the mixture comprises 1–15% lithium hydroxide and 85–99% hopcalite. The invention also provides for a filter assembly utilizing the filter material, for use in combination with a chemical oxygen generator for removing chlorine gas and carbon monoxide.

The lithium hydroxide coated hopcalite filter material of the invention is advantageous in that since the particle size is relatively small, the filter bed formed from the filter material is resilient, and can be pressure loaded to prevent the particles from moving due to vibration, so that the filter material resists problems of abrasion and channeling that are common in prior art granular hopcalite bed filters.

The particle size of the filter material is not so small, that it would cake and crack as easily as conventional granular hopcalite bed filters. Since only one layer of the coated hopcalite is needed, and the cross-sectional area of the filter bed is relatively small, the filter is easy to assemble, and the hopcalite powder can be readily packed evenly in the filter material holder.

The filter material is highly efficient, allowing the filter to be lighter. Typically only 10 to 15 grams of the filter material is needed. Thus, the invention has major benefits to aircraft oxygen generating systems. The filter is thus more than 30 grams lighter than conventional filters, and the housing required for the filter design can also be lighter than for conventional filters. If desired, the saving in weight can be used for increasing the amount of the oxygen generating chemical core to increase oxygen capacity without increasing the overall weight of the chemical oxygen generating system.

The filter is easier to manufacture, since the filter material can simply be scooped into a filter holder on a volume basis, even without weighing. Testing of the filter material is also simplified, in that only one or a few samples from a large batch of lithium hydroxide coated hopcalite that has been ground and sifted is needed, and only about a 200 lb. batch is sufficient for about 7,000 filters.

These and other aspects and advantages of the invention will become apparent from the following detailed description and the accompanying drawings, which illustrate by way of example the features of the invention.

BRIEF DESCRIPTION OF THE DRAWINGS

FIG. 1 is a partial sectional view of a chemical oxygen generator employing a filter employing the filter material of the invention; and FIG. 2 is an enlarged view of a section of the chemical oxygen generator of FIG. 1.

DETAILED DESCRIPTION OF THE PREFERRED EMBODIMENTS

High levels of carbon monoxide and some chlorine gas are common in the oxygen produced initially during chemical oxygen generation by a candle fueled by carbon-containing metal powders such as iron. However, no more than 0.2 ppm chlorine and 15 to 50 ppm carbon monoxide are allowed in the oxygen provided for aviation. Thus, both chlorine gas and carbon monoxide must be removed from the oxygen produced by such a system by filtration to provide a safely breathable gas. Granular soda lime, activated carbon, cast filters and granular bed filters with hopcalite have not proved to be entirely satisfactory for this purpose.

As is illustrated in the drawings, the invention is accordingly embodied in a filter material for removing chlorine gas and carbon monoxide from gas generated by a chemical oxygen generator for producing breathable gas. The filter material is preferably made of hopcalite coated or impregnated with lithium hydroxide that has been comminuted to about 20 to 100 mesh, and is suitable for removing chlorine and carbon monoxide in oxygen produced by chemical oxygen generators.

Hopcalite, a mixture of manganese dioxide and copper oxide commercially available in 10 to 20 mesh particle sizes, is typically made from fine powder hopcalite by granulation, pelletization or extrusion, having a surface area of 70 $m^2/g$ or higher. In one presently preferred method of preparing the filter material of the invention, the hopcalite is mixed with a lithium hydroxide solution in water, containing about 11% lithium hydroxide by weight, at room temperature. Approximately 100 ml of the lithium hydroxide solution is used for every 200 grams of hopcalite, and when the granular hopcalite is mixed with the solution, the granular hopcalite is wetted completely with the lithium hydroxide solution. The mixing can be done manually or with a mixer.

The lithium hydroxide coated hopcalite is then dried in an oven at about 200° C. for approximately 2 to 4 hours; and the dried lithium hydroxide coated hopcalite is then ground and sifted. The mixture typically comprises about 1–15% lithium hydroxide and about 85–99% hopcalite. The fraction of lithium hydroxide coated hopcalite between 20 and 100 mesh is collected, and used for making filters. Any particle size approximately between 20 and 100 mesh can be used. For example, 30 to 40 mesh, 40 to 60 mesh, 40 to 80 mesh, and 30 to 60 mesh, and 60 to 100 mesh can all be satisfactory. A particle size approximately between 30 and 80 mesh is generally preferred. Filter beds with coarser particles have a lower pressure drop, but are slightly less efficient due to diffusion-related mass transfer limitations within the particles. Filter beds with filter material particle sizes smaller than 100 mesh generally produce too great a pressure drop.

Alternatively, in another method of infusing the hopcalite with lithium hydroxide, the granular hopcalite can be placed in a perforated stainless steel basket, which is then typically dipped into a saturated lithium hydroxide solution for approximately two minutes, so that the granular hopcalite is wetted completely with the lithium hydroxide solution. The basket is then removed, and the excess solution drained from the hopcalite. The material is then dried at approximately 200° C., followed by the process noted above.

During grinding and siffing, the lithium hydroxide coated hopcalite absorbs moisture from the air, reducing its activity in removing carbon monoxide, so that the material is preferably heated at approximately 200° C. for about two hours, before it is loaded into the filter housing, in order to refresh the material's ability to remove carbon monoxide before it is loaded into a filter housing.

Referring to FIG. 1, when pin 10 of a chemical oxygen generator is pulled out, striker 12 hits the primer 14, and flame from the primer in turn ignites the ignition pellet 16. The resultant heat from the ignition pellet initiates the decomposition reaction of the chemical core 18, generating oxygen typically containing a few hundred ppm of carbon monoxide and chlorine gas. The oxygen, carbon monoxide and chlorine gas flow through the holes 22 at the trough 24 of a core retainer 20 through filter 30 to an outlet valve 50. The lithium hydroxide coated hopcalite 36, the active filtering material, is contained in a filter housing, preferably formed by a stainless steel cup 37, between a wire screen 32 supporting a particulate filter 34 and a particulate filter pad 38 to retain the filter material. Wire screen 40 supports the particulate filter pad, and the wire screen is secured by a retention ring 42 to the filter housing. Filtered oxygen that has passed through the filter generally has less than 0.2 ppm chlorine and less than 10 ppm carbon monoxide.

EXAMPLE 1

In a first example, a chemical oxygen generator designed to produce 360 liters of oxygen was provided with a filter as described above, containing 15 grams of 40–80 mesh lithium hydroxide coated hopcalite. Filtered oxygen from the chemical oxygen generator contained 4 ppm carbon monoxide, and no chlorine.

EXAMPLE 2

A chemical oxygen generator designed to produce 102 liters of oxygen was provided with a filter as described above, containing 10 grams of 40–60 mesh lithium hydroxide coated hopcalite. Filtered oxygen produced by the chemical oxygen generator contained 5 ppm carbon monoxide, and no chlorine.

EXAMPLE 3

A chemical oxygen generator designed to produce 138 liters of oxygen was provided with a filter as described above, containing 10 grams of 30–60 mesh lithium hydroxide coated hopcalite. Filtered oxygen from the chemical oxygen generator contained 2 ppm carbon monoxide, and no chlorine.

It should be appreciated that the lithium hydroxide coated hopcalite of the invention can also be used in filters to be placed outside of a chemical oxygen generator, such as between a chemical oxygen generator and passenger masks, to remove chlorine and carbon monoxide, or can also be used in breathing masks for use in environments where carbon monoxide or chlorine may be prevalent, such as in mines, in submarines, and in other similar settings, for example.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In a filter material for removing chlorine gas and carbon monoxide from a source for producing breathable gas, said filter material comprising a granular aggregation of hopcalite particles, the improvement in the filter material comprising:

a coating of lithium hydroxide on the hopcalite particles, and wherein said lithium hydroxide coated hopcalite particles have a particle size less than about 20 mesh so as to be small enough to pressure load the filter material and greater than about 100 mesh so as to be not so small that the filter material will cake and crack.

2. The filter material of claim 1 wherein said lithium hydroxide coated hopcalite particles have a particle size of approximately 30 to 80 mesh.

3. In a filter assembly for removing chlorine gas and carbon monoxide from gas generated by a chemical oxygen generator for producing breathable filtered gas, said filter assembly comprising a filter housing having an inlet for receiving said raw gas and an outlet for said breathable filtered gas; and a granular filter material disposed in said housing, said granular filter material being formed from an aggregation of hopcalite particles, the improvement in the filter assembly comprising:

a coating of lithium hydroxide on the hopcalite particles, and wherein said lithium hydroxide coated hopcalite particles have a particle size less than about 20 mesh so as to be small enough to pressure load the filter material and greater than about 100 mesh so as to be not so small that the filter material will cake and crack.

4. The filter assembly of claim 3, wherein said filter material has a lithium hydroxide coated hopcalite particle size of approximately 30 to 80 mesh.

5. In a method of manufacturing a filter material for removing chlorine gas and carbon monoxide from a source of gas for producing breathable gas, the improvement in said method comprising:

coating granules of hopcalite with lithium hydroxide;

comminuting the dried lithium hydroxide coated hopcalite to form particles of the dried lithium hydroxide coated hopcalite; and separating and collecting a fraction of the lithium hydroxide coated hopcalite particles, and wherein said fraction of particles have a particle size less than about 20 mesh so as to be small enough to pressure load the filter material and greater than about 100 mesh so as to be not so small that the filter material will cake and crack.

6. The method of claim 5, wherein said step of coating granules of hopcalite with lithium hydroxide comprises wetting said granules of hopcalite with a lithium hydroxide solution, and drying the granules.

7. The method of claim 6, wherein said granular hopcalite is mixed with said lithium hydroxide solution, and is wetted completely.

8. The method of claim 5, wherein said step of coating granules of hopcalite with lithium hydroxide comprises:

placing the granular hopcalite in a perforated container;

dipping the granular hopcalite in the perforated container into a saturated lithium hydroxide solution;

removing the container from the saturated lithium hydroxide solution;

draining excess solution from the hopcalite; and drying the lithium hydroxide coated hopcalite.

* * * * *

UNITED STATES PATENT AND TRADEMARK OFFICE
CERTIFICATE OF CORRECTION

PATENT NO.   : 6,296,689 B1
DATED        : October 2, 2001
INVENTOR(S)  : Yunchang Zhang et al.

It is certified that error appears in the above-identified patent and that said Letters Patent is hereby corrected as shown below:

<u>Title page,</u>
Item [57], ABSTRACT,
Line 1, change "filer", to read -- filter --.

Signed and Sealed this

Twenty-sixth Day of November, 2002

*Attest:*

*Attesting Officer*

JAMES E. ROGAN
*Director of the United States Patent and Trademark Office*